(12) United States Patent
Doya et al.

(10) Patent No.: US 9,869,405 B2
(45) Date of Patent: Jan. 16, 2018

(54) FLUID CONTROL APPARATUS

(71) Applicant: FUJIKIN INCORPORATED, Osaka-shi (JP)

(72) Inventors: Hidehiro Doya, Osaka (JP); Takayuki Suzuki, Osaka (JP); Kazuhiro Fujine, Osaka (JP); Shinya Nojima, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 266 days.

(21) Appl. No.: 14/648,258

(22) PCT Filed: Nov. 7, 2013

(86) PCT No.: PCT/JP2013/080074
§ 371 (c)(1),
(2) Date: May 28, 2015

(87) PCT Pub. No.: WO2014/084014
PCT Pub. Date: Jun. 5, 2014

(65) Prior Publication Data
US 2015/0337985 A1    Nov. 26, 2015

(30) Foreign Application Priority Data
Nov. 29, 2012   (JP) ................................ 2012-260586

(51) Int. Cl.
*F16K 49/00* (2006.01)
*F16K 27/00* (2006.01)

(52) U.S. Cl.
CPC .......... *F16K 49/002* (2013.01); *F16K 27/003* (2013.01); *F16K 49/00* (2013.01); *F16K 27/00* (2013.01); *Y10T 137/6416* (2015.04)

(58) Field of Classification Search
CPC ...... F16K 27/00; F16K 27/003; F16K 49/002; F16K 49/00; Y10T 137/6416
(Continued)

(56) References Cited

U.S. PATENT DOCUMENTS 3,733,459 A * 5/1973 Lengstorf ............. F16K 49/002
                                                    137/341
5,488,925 A * 2/1996 Kumada ............... C23C 16/455
                                                    118/715
(Continued)

FOREIGN PATENT DOCUMENTS

JP    2003-065462 A    3/2003
JP    2005-322797 A    11/2005
(Continued)

OTHER PUBLICATIONS

International Search Report dated Dec. 10, 2013, issued for PCT/JP2013/080074.

*Primary Examiner* — Kevin Murphy
*Assistant Examiner* — Josephine Trinidad-Borges
(74) *Attorney, Agent, or Firm* — Locke Lord LLP

(57) ABSTRACT

Provided is a fluid control apparatus in which a pipe heating member may be mounted or removed with flexibility (i.e., without affecting other components) while one line, composed of the plurality of fluid control devices arranged in series, as a unit may be added or modified readily. The apparatus includes: a plate-shaped support member 5 to which a plurality of passage blocks 22 are detachably mounted; a hollow metal mounting member 6 having an upper surface to which the support member 5 is secured and being detachably mounted to a base member; and a pipe heating member 7 fitted into the mounting member 6. The pipe heating member 7, including a bottom wall 29 and a pair of side walls 30, accommodates a pipe 24 between the side walls 30 and is fitted into the mounting member 6 with the pipe heating member 7 abutting the mounting member 6.

6 Claims, 4 Drawing Sheets

(58) Field of Classification Search
USPC .................................. 137/334, 341, 884, 883
See application file for complete search history.

(56) References Cited

U.S. PATENT DOCUMENTS

| | | | |
|---|---|---|---|
| 7,604,217 B2* | 10/2009 | Lum ..................... | F16K 5/0626 |
| | | | 251/148 |
| 7,726,333 B2* | 6/2010 | Hoshi ................... | F16K 27/003 |
| | | | 137/341 |
| 2004/0112446 A1* | 6/2004 | Eidsmore ............. | F16K 27/003 |
| | | | 137/884 |
| 2009/0277510 A1* | 11/2009 | Shikata ................ | F16K 27/003 |
| | | | 137/334 |

FOREIGN PATENT DOCUMENTS

| | | |
|---|---|---|
| JP | 2008-159905 A | 7/2008 |
| JP | 2010-053907 A | 3/2010 |

* cited by examiner

FLUID CONTROL APPARATUS

TECHNICAL FIELD

The present invention relates to a fluid control apparatus used in semiconductor fabrication equipment or the like, and more particularly, to a fluid control apparatus having heating means and formed by integrating a plurality of fluid control devices.

BACKGROUND ART

Fluid control apparatuses used in semiconductor fabrication equipment have been increasingly integrated. Such an integration of the fluid control apparatus is made by arranging a plurality of fluid control devices in series to form one line and disposing a plurality of such lines in parallel on a base member without interposing any pipes or joints for connection.

Such a fluid control apparatus may require heating means, and therefore downsizing of the fluid control apparatus including the heating means has been a problem to be overcome. Patent Literature 1 discloses using stacking blocks, disposing the stacking blocks to cover a pipe, and providing the stacking block with a fixation portion to secure a lower flow-path block on which a fluid control device is placed, thereby transferring heat generated at a heater.

CITATION LIST

Patent Literature

Patent Literature 1: Japanese Unexamined Patent Application Publication JP-A-2008-159905

SUMMARY OF INVENTION

Technical Problem

According to the fluid control apparatus disclosed in Patent Literature 1, the staking blocks, used regardless of whether a heater is used, support the lower flow-path blocks (passage blocks), and such a configuration causes a problem that the stacking block (a pipe heating member in the case where a heater is provided) cannot be mounted or removed with flexibility (i.e., without affecting other components). In addition, the fluid control apparatus disclosed in Patent Literature 1 has another problem that, in disposing a plurality of lines, each line being composed of a plurality of fluid control devices arranged in series, on a base member, each passage block is configured to be mounted directly on the base member, whereby addition or modification of one line as a unit is troublesome.

An object of the present invention is to provide a fluid control apparatus in which the pipe heating member is mounted or removed with flexibility (i.e., without affecting other components), while one line, composed of a plurality of fluid control devices arranged in series, as a unit may be readily added or modified.

Solution to Problem

The present invention provides a fluid control apparatus comprising: a plurality of fluid control devices arranged in series; a plurality of passage blocks that are arranged below the plurality of fluid control devices and support the plurality of fluid control devices; heaters, each covering some of the plurality of fluid control devices and the plurality of passage blocks, disposed on both sides thereof; and a pipe extending below the plurality of passage blocks; the fluid control apparatus further comprising: a plate-shaped support member to which the plurality of passage blocks are detachably mounted; a hollow metal mounting member having an upper surface to which the support member is secured, the mounting member being detachably mounted to a base member; and a pipe heating member composed of a bottom wall and a pair of side walls, the pipe heating member accommodating the pipe between the pair of side walls and being fitted into the mounting member such that the pipe heating member abuts the mounting member.

The fluid control apparatus of the present invention as described above constitutes one line of a fluid control system (an integrated fluid control system) having a plurality of lines. The fluid control devices and the passage blocks are mounted to the support member, and the support member is secured to the upper surface of the mounting member, whereby the fluid control apparatus constituting one line is obtained. The fluid control apparatuses are mounted to a base member within a housing to constitute the plurality of lines. In this case, required fluid control devices and passage blocks may be mounted to the support member outside the housing in advance, whereby this mounting work is facilitated. In addition, one line may be mounted to the base member in one work, i.e., in one step, and therefore adding or modifying one line, composed of the plurality of fluid control devices arranged in series, as a unit may be facilitated.

The pipe heating member is a block-shaped member made of aluminum, for example, and is adjacent to the pipe, to efficiently transfer heat from the heater to the pipe. The pipe heating member, which is a component that does not affect mounting of the fluid control device and the passage block even if the pipe heating member is omitted, may be mounted or removed with flexibility (i.e., without affecting other components).

It is preferable that the mounting member comprises a pair of side walls and a pair of end walls, each end wall connects corresponding ends of the side walls, each side wall is provided with at least one through hole, and a male screw inserted through the through hole is screwed into an internally threaded portion provided on the side wall of the pipe heating member, whereby the pipe heating member is detachably mounted to the mounting member. This configuration allows the pipe heating member to be mounted to or removed from the mounting member readily.

It is preferable that the mounting member further comprises a protruding upper edge provided to protrude inwardly from an upper surface of each of the end walls, and each of both ends of the support member is secured to the protruding upper edge. With this configuration, the support member is readily mounted to or removed from the mounting member.

It is preferable that the mounting member further comprises a protruding lower edge provided to protrude outwardly from a lower surface of each of the end walls, and the protruding lower edge is secured to the base member. Such a configuration allows the mounting member to be readily mounted to or removed from the base member.

The support member and the mounting member may be used for a line where the heater is not used. In this case, the pipe heating member may be omitted.

Advantageous Effects of Invention

As described above, in the fluid control apparatus of the present invention, the pipe heating member is mounted or removed with flexibility, i.e., without affecting other components, while adding or modifying one line, composed of the plurality of fluid control devices in series, as a unit is facilitated.

REFERENCE SIGNS LIST

1: fluid control apparatus, 4: heater, 5: support member, 6: mounting member, 7: pipe heating member, 11, 12, 13, 14, 15, 16, 17, 18, 19, 20, 21: fluid control device, 22, 23: passage block, 24: pipe, 29: bottom wall, 30: side wall, 34: side wall, 35: end wall, 36: front-rear protruding upper edge (protruding upper edge), 37: front-rear protruding lower edge (protruding lower edge), 38: through hole, 39: internally threaded portion, 40: male screw, 41: internally threaded portion, 42: projection, 43: internally threaded portion, 44: through hole

DESCRIPTION OF EMBODIMENTS

Embodiments of the present invention will be described below with reference to the drawings. In the following description, the upper and lower sides of the fluid control apparatus in FIG. 1 will be referred to as "upper" and "lower" sides, respectively. The right and left sides of the fluid control apparatus in FIG. 1 will be referred to as the "front" and "rear," respectively. The right and left sides as viewed toward the rear will be referred to as the "right" and "left," respectively. These terms "front" and "rear," "upper" and "lower," and "right" and "left" are just for convenience, and therefore the terms "front" and "rear" may be used to refer to the opposite sides, respectively, or the terms "upper" and "lower" may be used to refer to the "right" and "left."

Figure 1:
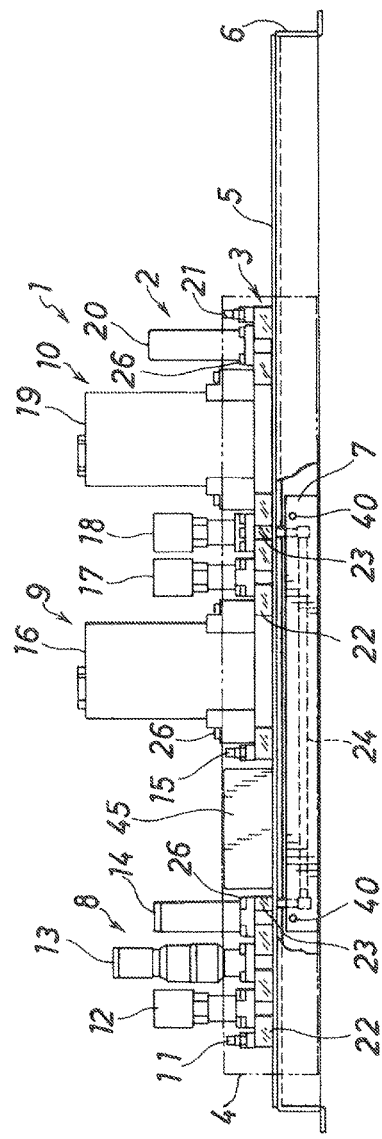
FIG. 1 is a side view of a fluid control apparatus in accordance with one embodiment of the present invention.
Figure 2:
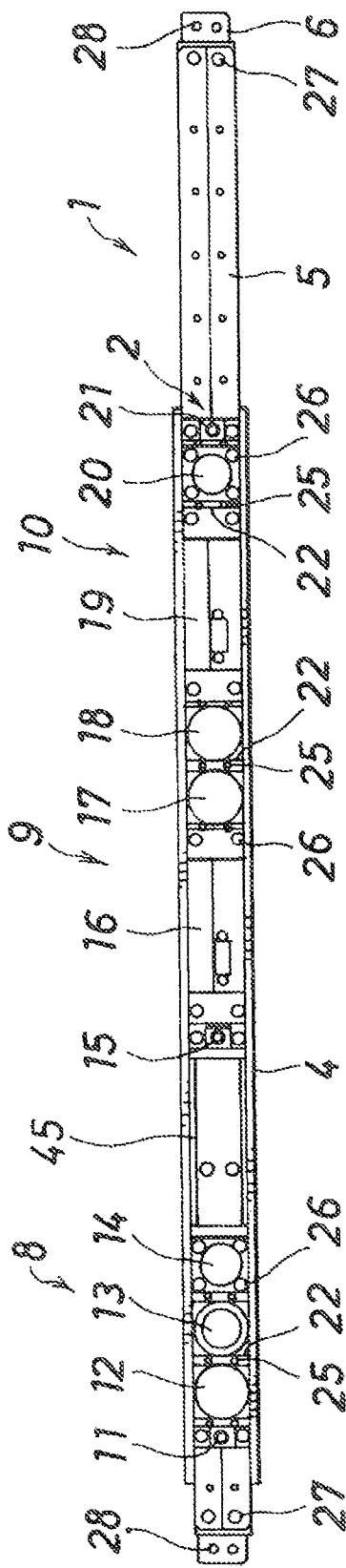
FIG. 2 is a plan view of the fluid control apparatus of FIG. 1.
Figure 3:
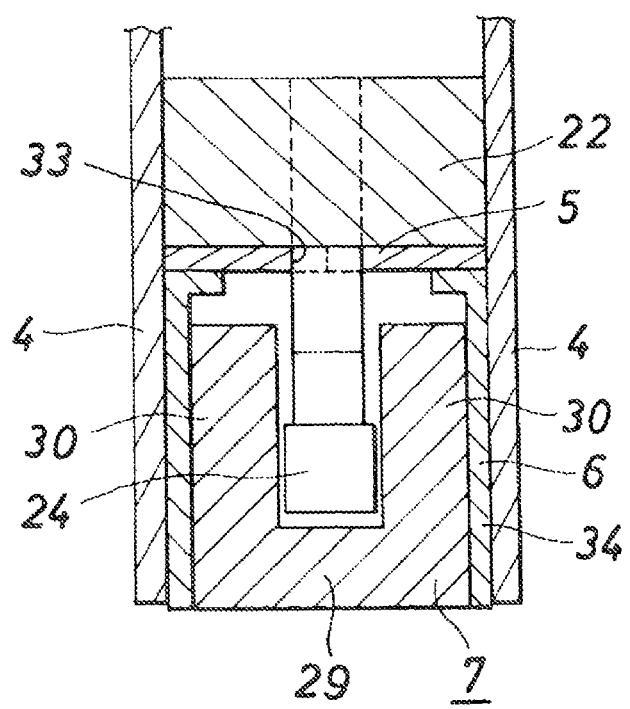
FIG. 3 is a transverse sectional view of the fluid control apparatus of FIG. 1.

As shown in FIGS. 1 to 3, in one embodiment of the present invention, the fluid control apparatus 1 includes: an upper stage 2 having a plurality of fluid control devices 11, 12, 13, 14, 15, 16, 17, 18, 19, 20, 21 arranged in series in the front-rear direction; a lower stage 3 having a plurality of passage blocks 22, 23 that support the plurality of fluid control devices 11, 12, 13, 14, 15, 16, 17, 18, 19, 20, 21; two plate-shaped heaters 4 heating a required location of the upper stage 2 and the lower stage 3; a support member 5 supporting the passage blocks 22, 23 of the lower stage 3; a hollow mounting member 6 disposed below the support member 5; and a pipe heating member 7 accommodated in the mounting member 6.

The plurality of passage blocks 22, 23, as lower stage constituents, are detachably mounted to the support member 5 at predetermined intervals by means of male screws 25. The fluid control devices 11, 12, 13, 14, 15, 16, 17, 18, 19, 20, 21, as upper stage constituents, are arranged so as to straddle the passage blocks 22, 23 that are adjacent to each other in the front-rear direction, and are detachably mounted to the corresponding passage blocks 22, 23 by means of male screws 26.

The support members 5 each of which supports the plurality of fluid control devices 11, 12, 13, 14, 15, 16, 17, 18, 19, 20, 21 are arranged in parallel on a base member (not shown) via mounting members 6, whereby a fluid control unit (for example, a gas supply unit for semiconductor fabrication) having a plurality of fluid control apparatuses (lines) 1, each of which is formed by the plurality of fluid control devices 11, 12, 13, 14, 15, 16, 17, 18, 19, 20, 21 arranged in series, is formed.

Provided as the upper stage 2 are, in order from the left (the inlet side): a first gas inlet portion 8 having a first gas inlet joint 11, a first on-off valve 12, a regulator 13, and a pressure sensor 14; a second gas inlet portion 9 having a second gas inlet joint 15, a first flow rate controller 16, and a second on-off valve 17; and an outlet portion 10 having a third on-off valve 18, a second flow rate controller 19, a filter 20, and a gas outlet joint 21.

An I-shaped passage (not shown) in a passage block 23 provided at the outlet of the pressure sensor 14 is brought into communication with an I-shaped passage (not shown) in a passage block 23 provided at a second gas inlet of the third on-off valve 18 by means of a pipe 24. The pipe 24, disposed below the plurality of passage blocks 22, 23, extends from the inlet side to the outlet side. Both ends of the pipe 24 extend upward and have upward openings. The third on-off valve 18 is a three-way valve, and shuts off or opens the passage for a gas from the first gas inlet portion 8 by operation of the third on-off valve 18.

The heater 4 is a plate-shaped one that is referred to as a panel heater. Two heaters 4 are disposed such that the plurality of fluid control devices 11, 12, 13, 14, 15, 16, 17, 18, 19, 20, 21, the plurality of passage blocks 22, 23, the support member 5, and the mounting member 6 are sandwiched between the heaters 4.

Between the pressure sensor 14 and the second gas inlet joint 15, a predetermined gap is provided in the front-rear direction. A plate-shaped gap filling member 45 is disposed so as to fill the gap. The heaters 4 abut the gap filling member 45, whereby torsion of the heaters 4 is prevented. This gap may be omitted, and in this case the gap filling member 45 may also be omitted.

The support member 5 is made of a stainless-steel flat plate material. The support member 5 has a length greater than the total length of the plurality of fluid control devices 11, 12, 13, 14, 15, 16, 17, 18, 19, 20, 21 along the direction of these arrangement (in the front-rear direction). The support member 5 has both ends in the front-rear direction that are detachably mounted to the mounting member 6 by means of male screws 27. The support member 5 is divided in half at its center in the across-the-width direction. This configuration allows the support member 5 to be mounted to the mounting member 6, with each of the both ends of the pipe 24 being held at its both sides in the right-left direction.

The mounting member 6 is hollow to accommodate the pipe heating member 7 therein, and is made of metal such as a stainless steel so as to efficiently transfer heat generated by the heater 4 to the pipe heating member 7. The mounting member 6 is detachably mounted at its both front-rear ends to the base member by means of male screws 28.

The pipe heating member 7 is a block-shaped aluminum member having a U-shaped cross section, and composed of a bottom wall 29 and a pair of side walls 30, as shown in FIG. 3. Between the pair of side walls 30, the pipe 24 is accommodated such that the side walls 30 and the pipe 24 are adjacent to each other or abut against each other. The pipe heating member 7 is fitted into the mounting member 6 such that an outside surface of each side wall 30 abuts an inside surface of the mounting member 6. The pipe heating member 7 abuts the mounting member 6 that abuts the heater 4, and is adjacent to or abuts the pipe 24, thereby efficiently transferring heat from the heater 4 to the pipe 24.

Figure 5:
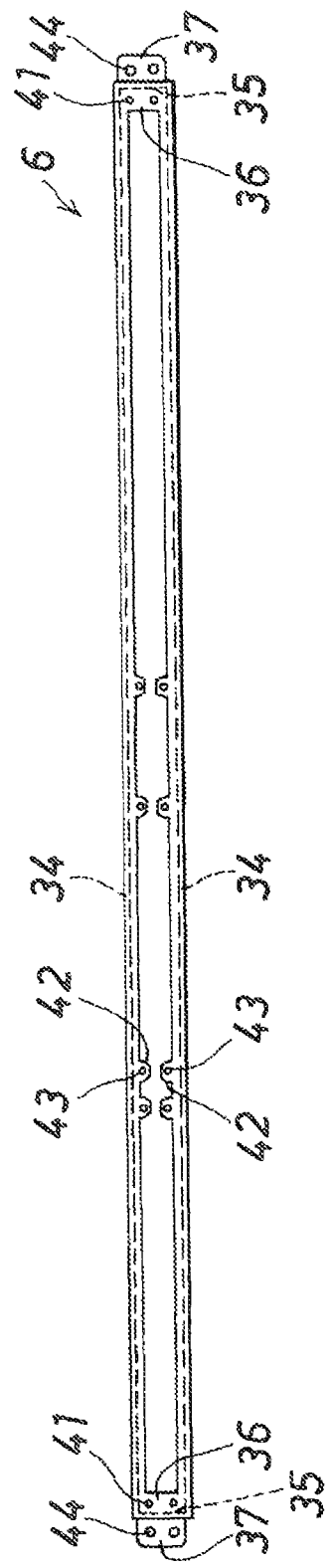
FIG. 5 is a plan view of a mounting member.
Figure 4:
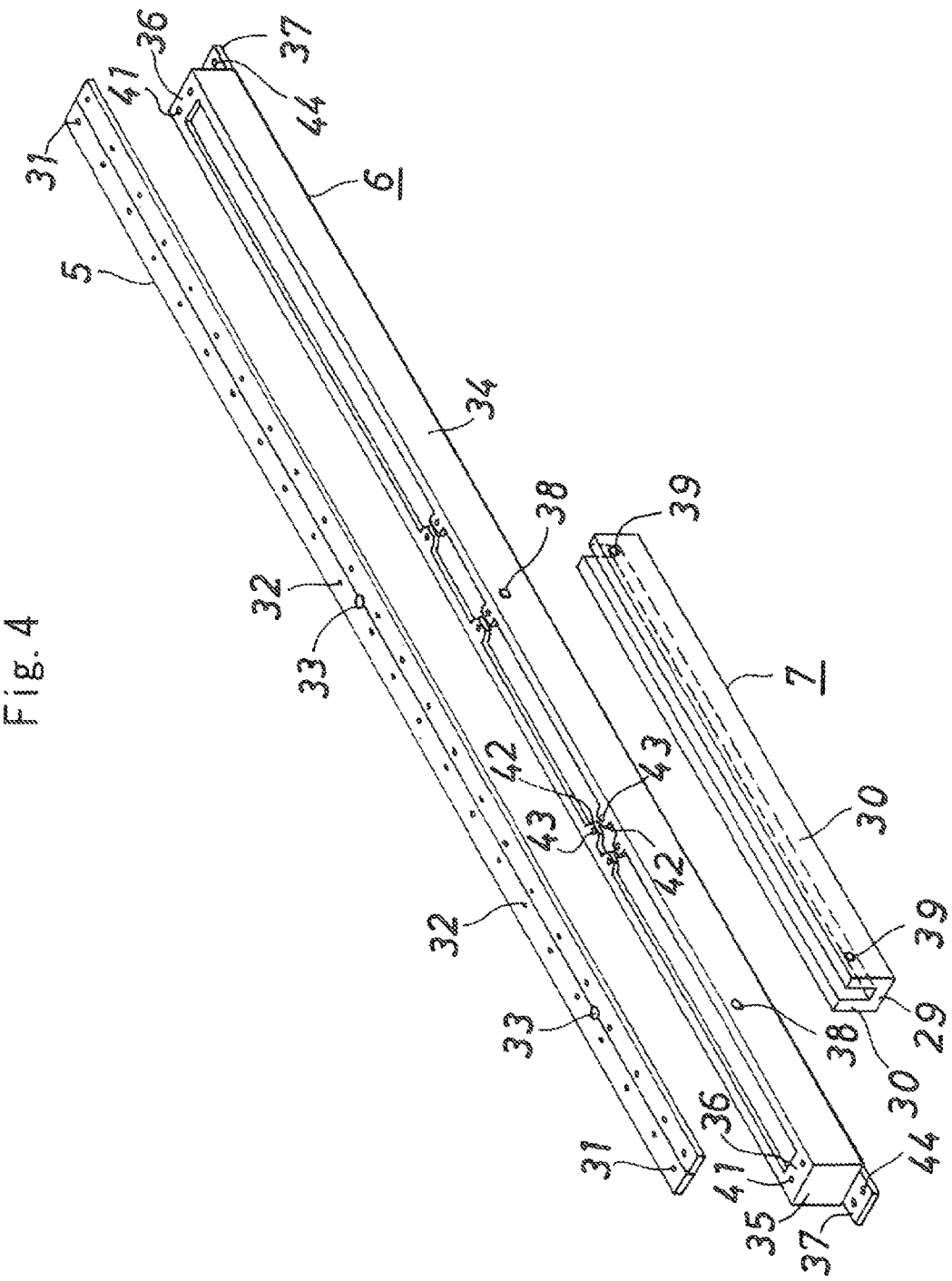
FIG. 4 is an exploded perspective view of a principal part of the fluid control apparatus of FIG. 1.

As shown in FIGS. 4 and 5 in detail, the support member 5 includes: through holes 31 through which male screws 27 for mounting the support member 5 to the mounting member 6 are inserted; a plurality of internally threaded portions 32 into which male screws 25 for securing the plurality of passage blocks 22, 23 to the support member 5 are screwed; and through holes 33 through which ends of the pipe 24 that is brought into communication with the passage block 23 are inserted.

The mounting member 6 includes: a pair of side walls 34; a pair of end walls 35, each of which connects corresponding ends of the side walls 34; front-rear protruding upper edges (protruding upper edges) 36 provided to protrude inwardly in the front-rear direction from respective upper surfaces of the end walls 35, the front-rear protruding upper edges 36 to which both ends of the support member 5 being secured, respectively; and front-rear protruding lower edges (protruding lower edges) 37 provided to protrude outwardly in the front-rear direction from respective lower surfaces of the end walls 35, and the front-rear protruding lower edges 37 being secured to the base member.

Each of the side walls 34 of the mounting member 6 is provided with through holes 38 for mounting the pipe heating member 7. Each of the side walls 30 of the pipe heating member 7 is provided with internally threaded portions 39 to correspond to the through holes 38 of the side wall 34 of the mounting member 6. Male screws 40 shown in FIG. 1 are inserted through the through holes 38 of the side wall 34 of the mounting member 6 to be screwed into the internally threaded portions 39 of the side wall 30 of the pipe heating member 7, whereby the pipe heating member 7 is detachably mounted to the mounting member 6.

The front-rear protruding upper edge 36 of the mounting member 6 is provided with internally threaded portions 41 into which male screws 27 that mount the support member 5 to the mounting member 6 are screwed. On the upper surface of the side wall 34 of the mounting member 6, projections 42 projecting in the right-left direction are provided at required intervals in the front-rear direction. These projections 42 are also provided with internally threaded portions 43 into which male screws 27 that mount the support member 5 to the mounting member 6 are screwed. The front-rear protruding lower edge 37 of the mounting member 6 is provided with through holes 44 through which male screws (not shown) for securing the mounting member 6 to the base member are inserted.

The fluid control apparatus 1 described above constitutes one line of a system (an integrated fluid control system) where a plurality of lines 1 are arranged in parallel on the base member at required intervals. The integrated fluid control system, used further in combination with other systems, serves as gas supply equipment for fabricating semiconductors. Therefore, due to area constraints of the base member, reducing the installation area of the fluid control apparatus 1 is desired. With the fluid control apparatus 1 in accordance with this embodiment, disposing a pipe 24 below the passage blocks 22, 23 achieves a reduced installation area. Since the pipe heating member 7 that heats the pipe 24 is accommodated in the mounting member 6, providing the pipe heating member 7 does not entail an increased installation area.

The fluid control apparatuses 1 are mounted to the base member in the housing to constitute required lines. In this case, required fluid control devices 11, 12, 13, 14, 15, 16, 17, 18, 19, 20, 21 and required passage blocks 22, 23 may be mounted to the support member 5 outside the housing in advance, which facilitates the mounting work. The support member 5 may be mounted to the mounting member 6 before the mounting member 6 is mounted to the base member, or the support member 5 may be mounted to the mounting member 6 that has already been mounted to the base member. In either case, one line may be installed on the base member in one work, i.e., in one step. Consequently, one line, composed of the plurality of fluid control devices 11, 12, 13, 14, 15, 16, 17, 18, 19, 20, 21 arranged in series and the plurality of passage blocks 22, 23 arranged in series, as a unit may be added or modified readily.

The pipe heating member 7 alone may be mounted or removed, with the other components (the plurality of fluid control devices 11, 12, 13, 14, 15, 16, 17, 18, 19, 20, 21 and the plurality of passage blocks 22, 23) being left as they are, so the pipe heating member 7 may be mounted or removed with flexibility, i.e., without affecting other components.

In the above embodiments, each fluid control device 11, 12, 13, 14, 15, 16, 17, 18, 19, 20, 21 alone may be removed upward, and there is no parts constituted by mounting multiple fluid control devices to one block, whereby maintenance or modification of each fluid control device 11, 12, 13, 14, 15, 16, 17, 18, 19, 20, 21 is facilitated. In addition, since the both ends of the pipe 24 extend upward and are open upward, connecting the pipe to the passage block 23, which is sandwiched between the passage blocks 22, is facilitated. Further, the pipe 24 thus configured may have a smaller length in the front-rear direction as compared with one that has both ends being open frontward and rearward and welded to the passage blocks.

In the above embodiments, the pipe 24 is disposed to connect the pressure sensor 14 that is at the rear (inlet side) of the first flow rate controller 16, and the third on-off valve 18 that is at the rear (inlet side) of the second flow rate controller 19, whereby these two flow rate controllers (thermal mass flow rate controllers such as mass flow controllers, and pressure-type flow rate controllers, etc.) 16, 19 are readily disposed in one line. However, the fluid control devices connected by means of the pipe 24 are not limited to the illustrated examples.

In the above embodiments, the configuration above the support member 5, i.e., the configuration of the fluid control devices and the passage blocks is not limited to that shown in the drawings, and various configurations may be employed.

INDUSTRIAL APPLICABILITY

The present invention is suitable for use as a fluid control apparatus including a pipe heating member. In the present invention, the pipe heating member may be mounted or removed with flexibility (i.e., without affecting other components), while one line, composed of a plurality of fluid control devices arranged in series, as a unit may be readily added or modified. This configuration facilitates fabrication of the fluid control apparatus.

What is claimed is:
1. A fluid control apparatus comprising:
a plurality of fluid control devices arranged in series;
a plurality of passage blocks that are arranged below the plurality of fluid control devices and support the plurality of fluid control devices;

heaters, covering both sides of some of the plurality of fluid control devices and the plurality of passage blocks; and a pipe extending below the plurality of passage blocks;

the fluid control apparatus further comprising:

a plate-shaped support member to which the plurality of passage blocks are detachably mounted;

a hollow metal mounting member having an upper surface to which the support member is secured, the mounting member being detachably mounted to a base member; and a pipe heating member composed of a bottom wall and a pair of side walls, the pipe heating member accommodating the pipe between the pair of side walls and being fitted into the mounting member, wherein the heaters abut an outside surface of the mounting member and an outside surface of each side wall of the pipe heating member abuts an inside surface of the mounting member.

2. The fluid control apparatus according to claim 1, wherein the mounting member comprises a pair of side walls and a pair of end walls, each end wall connects corresponding ends of the side walls, each side wall is provided with at least one through hole, and a male screw inserted through the through hole is screwed into an internally threaded portion provided on the side wall of the pipe heating member whereby the pipe heating member is detachably mounted to the mounting member.

3. The fluid control apparatus according to claim 2, wherein the mounting member further comprises a protruding upper edge provided to protrude inwardly from an upper surface of the end walls, and each of both ends of the support member is secured to the protruding upper edge.

4. The fluid control apparatus according to claim 2, wherein the mounting member further comprises a protruding lower edge provided to protrude outwardly from a lower surface of the end walls, and the protruding lower edge is secured to the base member.

5. The fluid control apparatus according to claim 2, wherein the mounting member further comprises a protruding lower edge provided to protrude outwardly from a lower surface of the end walls, and the protruding lower edge is secured to the base member.

6. The fluid control apparatus according to claim 3, wherein the mounting member further comprises a protruding lower edge provided to protrude outwardly from a lower surface of the end walls, and the protruding lower edge is secured to the base member.

* * * * *